UNITED STATES PATENT OFFICE.

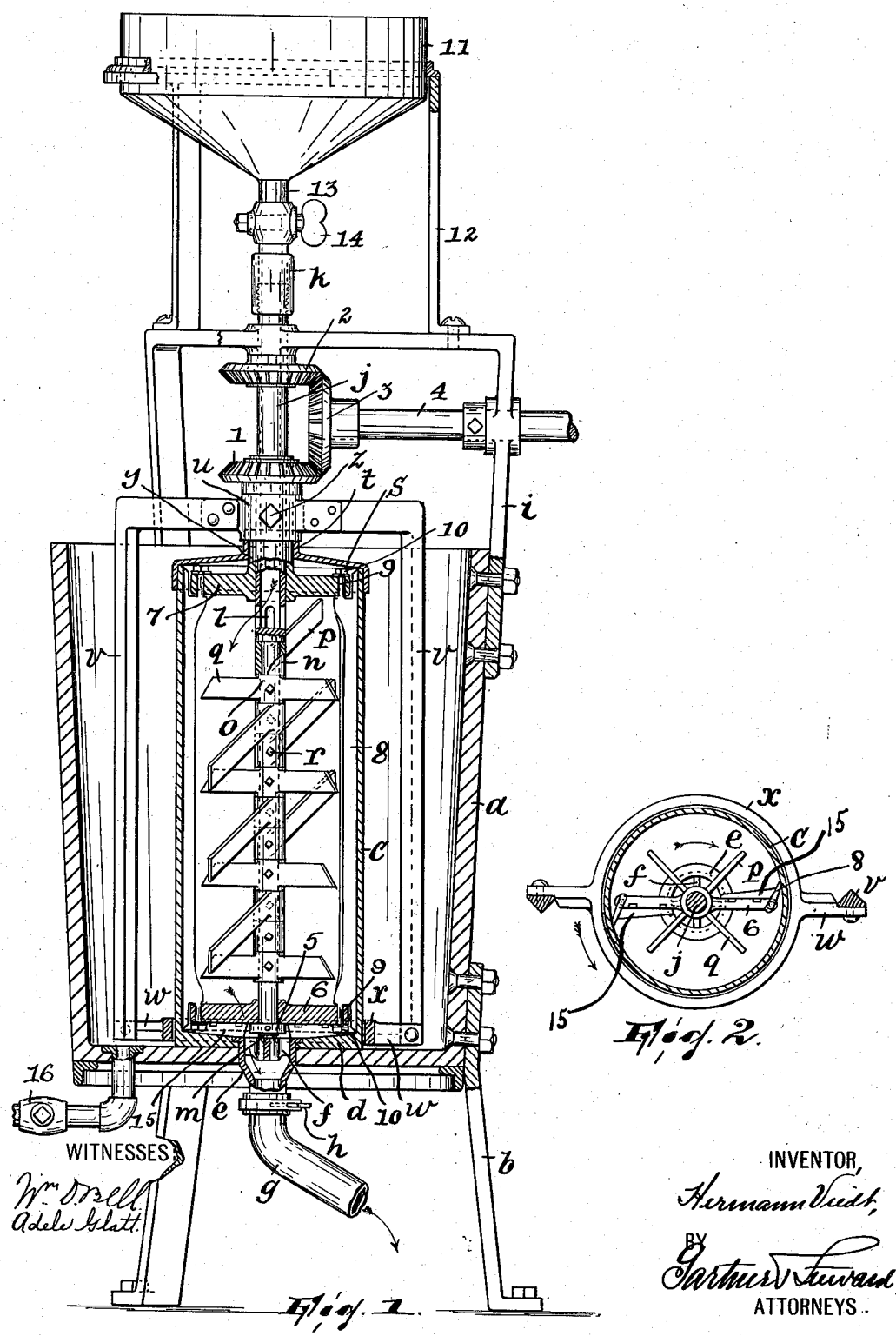

HERMANN VIEDT, OF MORRISTOWN, NEW JERSEY.

ICE-CREAM FREEZER.

No. 847,853.      Specification of Letters Patent.      Patented March 19, 1907.

Application filed January 20, 1906. Serial No. 297,083.

*To all whom it may concern:*

Be it known that I, HERMANN VIEDT, a citizen of the United States, residing in Morristown, Morris county, New Jersey, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is an improvement in that class of machines for freezing liquids, as in the making of ice-cream, wherein the liquid is designed to leave the apparatus in but a semisolid state to be afterward completely solidified in molds in separate apparatus.

One of the essential features of the present invention is such an arrangement of the operating parts that the liquid to be frozen is caused to follow a substantially straight downward course from the time it enters the apparatus to the time it leaves the same.

Various advantages over apparatuses in which the liquid is not caused to take a straight downward course are presented by my arrangement, such as simplicity of construction, the reducing of the power necessary to drive the moving parts to the minimum, convenience of access to the moving parts when such is necessary, as for repairs; smoothness or regularity in quality of the product, and the facility of charging the apparatus and withdrawing the frozen substance.

In the accompanying drawing, in which my invention is fully illustrated, Figure 1 is a view, partly in vertical section and partly in elevation, of one form of my invention; and Fig. 2 is a horizontal sectional view through the receptacle for containing the material to be frozen, the agitating means and its accessories contained in said receptacle, and the agitating means for the freezing substance.

$a$ is a receptacle for the freezing substance, which may be any of those in common use. Said receptacle is preferably supported by three or more legs $b$, which may be secured by screws or the like to the floor.

In the receptacle $a$ is another receptacle $c$, which is preferably a cylinder closed at its lower end, as by the wall $d$, and open at its upper end, such receptacle being of the vertically-elongated type in common use for a reason hereinafter explained. The wall $d$ is on its inside dished or concaved, and in it is set a bushing $e$, formed with an interior spider $f$, said bushing forming the upper end of a discharge-pipe $g$, the way through which may be controlled by a valve $h$.

$i$ is a three-legged frame in which is journaled axially of the two receptacles $a$ and $c$ a shaft $j$. This shaft has screwed onto its upper end a sleeve $k$, and it is hollow down to a point somewhat below the top of the receptacle $c$, where it has discharge-ports $l$, forming escape for the liquid passing therethrough, in the manner hereinafter described, into the receptacle $c$. The lower end of this shaft $j$ is of conical form, as at $m$, and is stepped in the spider $f$. From a point slightly below the ports $l$ to its bottom end said shaft $j$ is reduced, and on its reduced portion are set, in abutment with each other throughout, the collars $n$ and $o$ of agitators $p$ and $q$, said collars being secured on the shaft to rotate therewith by set-screws $r$. The agitators $p$ are arms formed integrally in each instance with their collar $n$ and extending obliquely, the one up and the other down in diametrically opposite directions from said collar. The agitators $q$ are arms extending in each instance radially from their collar $o$ in preferably a horizontal direction, being also diametrically opposite each other. On account of my agitating means being thus constructed in sections if any one unit comprising a collar and arms $p$ or $q$ becomes broken or damaged it may be removed for repairs, while the others are left on the shaft for the continued working of the apparatus.

$s$ is a cover which fits sungly over the top of the receptacle $c$ and has a centrally upwardly extending boss $t$, penetrated by the shaft $j$. A collar $u$, carrying downwardly-extending arms $v$, arranged to rotate in the space between the receptacles $a$ and $c$, rests on said boss $t$. To guide the lower ends of the arms $v$ true with relation to their axis, they are fixed to lugs $w$, projecting diametrically from a ring $x$, surrounding the lower end of the receptacle $c$. Collar $u$ is penetrated by a sleeve $y$, to which it is fixed by a set-screw $z$, the upper end of the sleeve $y$ carrying a bevel-gear 1. Said bevel-gear, the sleeve, the collar $u$, and the arms carried thereby, together with certain of the parts hereinafter to be described, rotate reversely to shaft $j$, which is driven through a bevel-gear 2, fixed thereon, from a bevel-gear 3, which also drives bevel-gear 1. The bevel-gear 3 is arranged on the drive-shaft 4 of the machine, which shaft is journaled in one of the legs *i*.

On the lower end of the shaft *j* is secured a collar 5, on which is supported a cross-piece 6, in which the shaft may freely rotate. This cross-piece and arms 7 on the collar *y* are connected by blades 8, which have trunnions 9 set in the corresponding arm and cross-piece in such manner that the blades as they are rotated in the direction of the outer arrow in Fig. 2, with the collar *y* and arms 7, clear the side wall of receptacle *c* of any of the material being frozen which tends to adhere thereto. Nuts 10 on these trunnions are set up tightly enough against the arms 7 and cross-piece 6 so that while the latter follows in the rotation of the blades the blades can still turn on the trunnions under the action of the liquid in the receptacle *c* as said blades rotate.

11 is a hopper, supported by uprights 12 on the frame *i* and having a straight discharge-pipe 13, which fits into the sleeve *k* and has a valve 14 for controlling the way therethrough.

Inasmuch as the frozen material would tend to cling to the bottom of the receptacle *c*, and so clog the passage by way of spider *f*, I provide means for clearing the bottom of the adhering material, consisting in blades 15, pivoted to the under side of the cross-piece 6 and shaped to fit the concave form of the bottom *d* of said receptacle.

16 is a valved pipe for withdrawing the liquid contained in receptacle *a*.

In operation the liquid to be frozen is introduced into the hopper 11 and the valve 14 being open the same escapes downwardly through shaft *j* and out of its ports *l* into the receptacle *c*. Meantime the shaft and the agitators *p* and *q* are rotating in one direction, while the blades 8 and arms *v* are rotating in the other direction. The valve *h* is of course during this portion of the operation closed. When the cream or other material to be frozen has reached the state where it is ready for discharge, the valve *h* is opened, and the operating parts being kept in motion it is thereby caused to be discharged through pipe *g* into a suitable receptacle.

It will be observed that the course of the material being frozen through the machine is a practically straight downward course throughout—*i. e.*, not only from the time it enters the receptacle *c* near its top and discharges therefrom at the bottom, but also from the hopper 11 to the discharge-point of the receptacle *c*. These conditions and the fact that the receptacle is of the vertically-elongated type result in the freezing operation being effected quickly and in smoothness and regularity in the quality of the product, as also in the attainment of the several other advantages named in the opening part of this specification.

Having thus fully described my invention, what I claim as new, and desire to secure by Letters Patent, is—

1. In an ice-cream freezer or the like, the combination, with the receptacle for the freezing material, of a receptacle for the material to be frozen arranged therein, a rotary shaft arranged vertically in the last-named receptacle, agitators carried by said shaft, said shaft being hollow from its upper end to a point below the top of said last-named receptacle and having discharge-ports near the top of said receptacle, an outlet in the bottom of said receptacle, and a spider arranged in said outlet and forming a step-bearing for said shaft, substantially as described.

2. In an ice-cream freezer or the like, the combination of a receptacle for the freezing material, a receptacle for the material to be frozen arranged therein, means, comprising a rotary shaft arranged axially of said last-named receptacle, for admitting to the last-named receptacle the material to be frozen, means for effecting the discharge of said last-named receptacle, agitators carried by said shaft, a collar penetrated by said shaft, arms carried by said collar and extending down into the first-named receptacle, a guiding-ring for the lower ends of said arms surrounding and having a bearing on said last-named receptacle and connected with said arms, and means for rotating said collar and the shaft, substantially as described.

3. In an ice-cream freezer or the like, the combination of a receptacle for the freezing material, a receptacle for the material to be frozen fixed therein against lateral movement, means, comprising a rotary hollow shaft arranged axially of said last-named receptacle, for admitting to the last-named receptacle the material to be frozen, a collar penetrated by said shaft, arms carried by said collar and extending down into the first-named receptacle, a guiding-ring for the lower ends of said arms surrounding and having a bearing on the last-named receptacle and connected with said arms, a frame carried by said first-named receptacle, and affording a bearing for said shaft, a hopper carried by the frame and discharging into said shaft, and means, comprising another shaft journaled in said frame, for rotating the shaft and said collar, substantially as described.

In testimony that I claim the foregoing I have hereunto set my hand this 27th day of October, 1905.

HERMANN VIEDT.

Witnesses:
JOHN W. STEWARD,
ADELE GLATT.